United States Patent Office 3,280,886
Patented Oct. 25, 1966

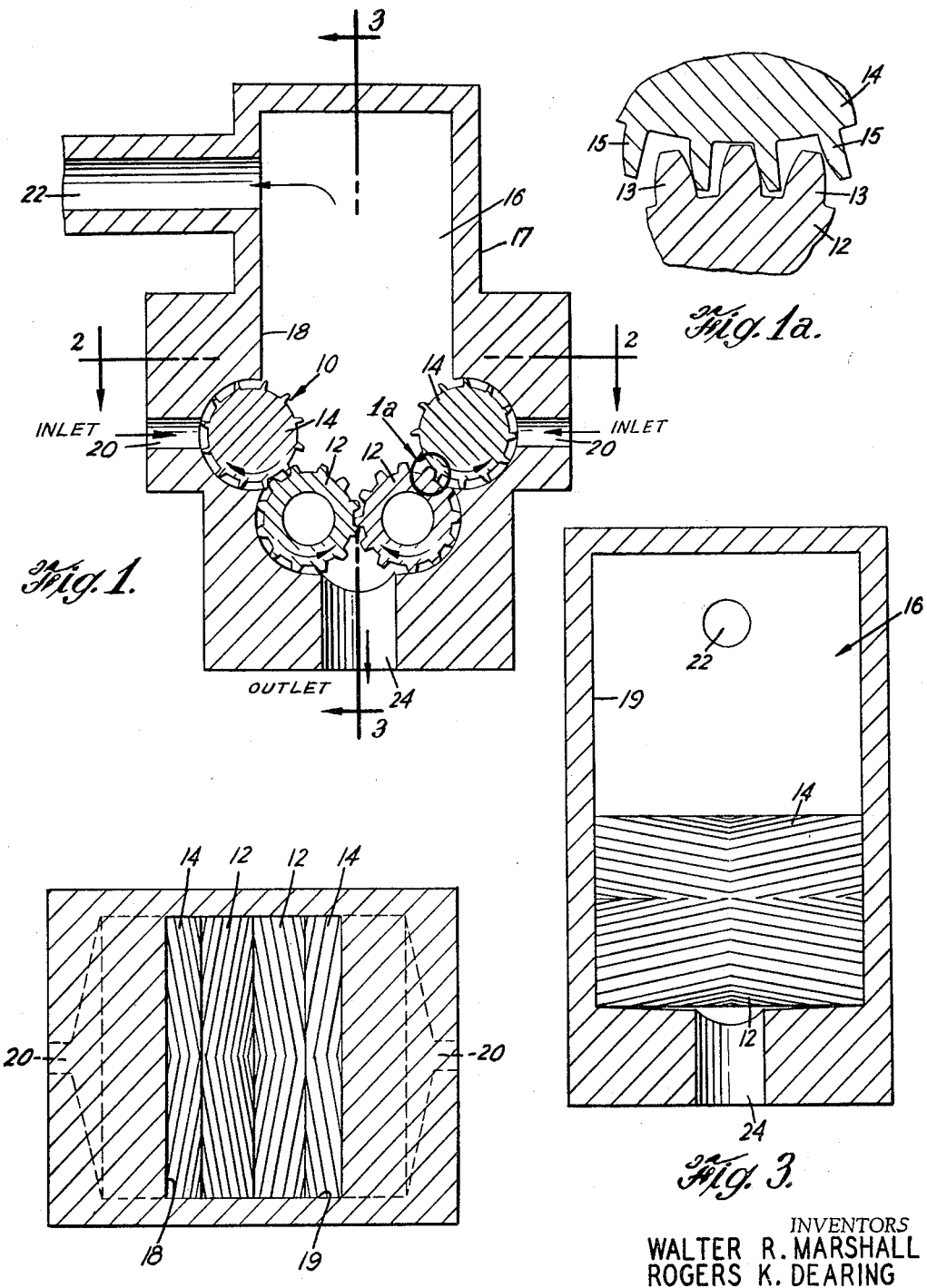

3,280,886
APPARATUS FOR THE DEVOLATILIZATION OF FOAMABLE VISCOUS SOLUTIONS
Walter R. Marshall, Bloomfield, and Rogers K. Dearing, Westfield, N.J., assignors to Union Carbide Corporation, a corporation of New York
Filed Aug. 24, 1965, Ser. No. 482,181
5 Claims. (Cl. 159—2)

This invention relates to the recovery of concentrated solute from foamable viscous solutions such as polymer solutions, particularly polystyrene solutions.

The effective separation of solvent from viscous solutions has been a major commercial concern as where a high concentration of solute is sought. For example: in the preparation of uniform polymers from their monomers as in mass polymerization or by other conventional methods such as from monomeric substances dissolved in inert liquids, considerable amounts of the starting materials remain mixed with or entrained in the polymer product. Thus, in the conventional production of polystyrene from the monomer it becomes increasingly difficult after about 65% conversion, to maintain uniform reaction temperatures and thus produce polymers of substantially uniform molecular weight. The rising viscosity of the solution tends to inhibit effective heat removal and the reaction temperature begins to rise resulting in the formation of polymer of decreasing molecular weight. Accordingly, the reaction must generally be halted after attaining a yield of about 65%. It is thus necessary to separate at least the greater portion of the starting materials from the polymer to recover a substantially pure product.

A common method for recovery of the product solute or concentrate from such viscous solutions is to devolatilize the solution. The solution is heated and introduced into a low pressure chamber to flash vaporize its solvent. However, a major difficulty with this method is that when the flashed solution tends to foam, considerable vapor is entrapped therein and remains with the product. In addition, the cooling caused by vaporization so increases the viscosity of the product that it is difficult to remove the polymer from the flash chamber. The solution may be further heated to offset this problem; however, heating the solution to provide for all of the heat of vaporization can result in polymer degradation or other undesirable polymer formation.

The addition of conventional gear pumps to the flash chamber for removing the polymer has not been effective since the foam is not sufficiently broken down thereby. Instead the foam feed forms a covering on the gear and accumulates to such an extent that the vapor released by the agitation of the gears is entrapped therein. The incoming foam continues to build up on the gears forming a covering or bridge and blocks the feed inlet. If the feed pressure is increased the foam further builds up and can be lost out the chamber vent. Thus an effective method and apparatus for flash-vaporization of a viscous solution and recovery of the concentrate thereof has not been known.

Accordingly it is an object of this invention to provide an apparatus for effectively devolatilizing foamable viscous solutions.

This and other objects are provided in the present invention which provides an apparatus for devolatilizing foamable viscous solutions comprising: a housing having a chamber therein, said chamber having a feed inlet, a product outlet and a vapor outlet therein communicating with said chamber; a gear train mounted in said chamber having at least two closely intermeshed rotatable pumping gears and adapted to provide, when rotated, an intermeshing discharge zone to discharge solution through said product outlet and at least one feeding gear adapted to intermesh with one of said pumping gears with excessive clearance between each cooperating tooth and tooth space thereof to provide an open bite therebetween, said feeding gear being substantially removed from the intermeshing discharge zone of said pumping gears; said feed inlet adapted to receive foamable viscous solution maintained at a selected temperature and pressure and to direct said solution to at least the periphery of said feeding gear; said vapor outlet being adapted to communicate with evacuating means for maintaining the chamber at a pressure substantially lower than said selected pressure and below the vapor pressure of the solution at said temperature; and drive means connected to at least one gear for rotating all the gears of the gear train so that the direction of travel of the intermeshing teeth of said pumping gears is away from at least the inner portion of said product outlet to discharge the product solution therethrough.

The invention will become more apparent from the following detailed specification and drawings, in which:

FIGURE 1 is a sectional elevation view of the apparatus embodying the invention illustrating the devolatilization chamber and gear train mounted therein.

FIGURE 1A is an enlarged sectional view of the engaging gear teeth of a portion of the gear train of FIGURE 1.

FIGURE 2 is a cross-sectional view of the apparatus of FIGURE 1, taken along the line 2—2, looking in the direction of the arrows; and FIGURE 3 is a cross-sectional view of the apparatus of FIGURE 1 taken along the line 3—3 looking in the direction of the arrows.

Referring now to the drawings, gear train 10 is rotatably mounted in the devolatilization chamber 16 within the housing 17 in working proximity with the chamber walls 18 and 19 as shown in FIGURES 1 and 2. The pumping gears 12 of the gear train 10 are closely intermeshed with one another and openly intermeshed with feeding gears 14, e.g. the teeth 15 of feeding gear 14 form an open bite with the teeth 13 of pumping gear 12 as shown in FIGURES 1 and 1A.

Drive means (not shown) are provided for rotating the pumping gears 12 so that the direction of travel of the intermeshing teeth 13 thereof is away from at least the inner portion of the product outlet 24, as shown in FIGURE 1. The drive means may also serve to drive the feeding gears 14 in cooperation with the pumping gears 12.

A pair of feed inlets 20 provide access for the feed solution to feed gears 14 and thus to the chamber 16 as shown in FIGURES 1 and 2 and product outlet 24 serves to provide a route of discharge for the product as shown in FIGURES 1 and 3.

Vapor outlet 22 is adapted to communicate with evacuating means (not shown) for maintaining the pressure in the chamber 16 below the vapor pressure of the solution to be introduced thereto for devolatilization thereof and also for conveying away the resulting vapors therethrough as shown in FIGURES 1 and 3.

The feed solution is thus introduced at feed ports 20 to the peripheries of the feeding gears 14 which convey the solution into the devolatilization chamber 16 for extensive vaporization of the feed solvent. The solution foams vigorously tending to blanket the merging gear surfaces. The foam is then conveyed by each pair of engaging gears, 12 and 14, to their respective intermeshing zones for shearing and compacting therebetween to provide additional vapor release. The released vapor or volatile is then drawn off through vapor outlet 22. The substantially devolatilized solution, a viscous liquid is distributed between the partially intermeshed gears so that a portion thereof is recycled on feeding gears 14 to join the incoming feed solution at inlet ports 20 and the remaining portion is conveyed by pumping gears 12 to their mutual engagement, i.e., the intermeshing discharge zone thereof, where it substantially is stripped from the closely intermeshing teeth 13 thereof. The liquid product then issues from the chamber 16 by way of product outlet 24.

The apparatus of this invention serves to effectively devolatilize viscous foamable solutions. As used herein a viscous foamable solution is any solution which tends to form, when its solvent or solvents are vaporized a viscous liquid-vapor foam subject to mechanical shear for vapor release. Such solutions are foamed, effecting partial vapor release of the solvent and then subjected to mechanical shear which breaks down and compacts the foam releasing a substantial portion of the entrapped vapor to provide, as a product, a highly devolatilized solution. It will be recognized that where the above solutions contain impurities, i.e., gases, for example, carbon dioxide or liquid volatiles in addition to the above solvent, these impurities or components will be released along with the above solvent vapors in accordance with the nature of such impurities, such as their vapor or partial pressures and process conditions, including the temperature and pressure. The above solutions, can include polymeric materials such as polystyrene, polyethylene, dissolved in a suitable volatile solvent or other materials which form such foam. Polystyrene, for example, is readily dissolved in its monomer or other solvent such as ethyl benzene.

The solution is fed to the pressure chamber or vapor-liquid separation zone at temperatures sufficient to cause vigorous devolatilization thereof when the feed enters the chamber but below the temperature at which the particular solution components degrade or are otherwise adversely affected. And the solution is preferably maintained at a pressure sufficiently high to prevent boiling thereof in the feed lines by throttle valves, for example, mounted in the lines adjacent to the chamber. However, extensive boiling in the lines may occur without materially affecting the vapor-liquid separation in the chamber. For example, a 70% solution of polystyrene dissolved in its monomer is suitably heated to between 175° and 225° C. and fed at 90 p.s.i.g. to the chamber so that substantially no boiling of the solution occurs until such solution reaches the chamber. If the line pressure is reduced to 20 p.s.i.g. so that about 50% devolatilization of the solvent occurs therein, the vapor-liquid separation is substantially the same and a resin solution product of 97% solids or more may be obtained.

The pressure in the chamber is maintained at below the vapor pressure of the feed solution and preferably well below the feed pressure to provide a substantial pressure drop and flash vaporization of volatile such as the solvent or solvents thereof, with resultant vigorous foaming of the solution. The temperature of the chamber is preferably sufficiently high to maintain the solution product in a liquid state as well as vaporize the solvent component. The chamber temperature is determined by diverse factors, for example, by its maintained pressure and by the temperature thermoproperties of the feed solution which upon entering expands and cools. For example, where the feed temperature of an entering 75% polystyrene in ethyl benzene solution is 200° C. and the chamber pressure is 50 mm. Hg the temperature therein is about 175° C.

For the feed of polystyrene-monomer solution the chamber pressure is suitably about 300 to 10 mm. Hg but preferably the lower value.

A conventional vacuum pump or other suitable evacuating means, connected, for example, to the upper portion of the chamber by way of a vapor outlet, is suitable for the invention. A condenser can be connected to the vacuum pump, e.g., for recovery of the exiting vaporized solvent. However, where a low boiling solution is fed to the chamber, for example, under high temperature and pressure, evacuating means can appropriately be dispensed with in accordance with process requirements.

The foamable viscous solution is introduced to the chamber by way of one or more feed inlets. The feed inlet may, if desired, communicate with the chamber over the feeding gear or gears so that the feed solution enters the chamber for vigorous foaming and is deposited upon the feeding and pumping gears for working therebetween. Preferably, however, each feed inlet comunicates directly with the confines of the periphery of a feeding gear so that every portion of the incoming feed is conveyed by the one or more feeding gears into the chamber and thence to the pumping gears. In such case, the feed inlets should extend substantially along the length of the feeding gears to feed the influent uniformly across the face thereof.

At least one product outlet is located in the chamber so that at least the inner portion of the oulet is situated in the vicinity of the intermeshing discharge zone of the pumping gears on the discharge side thereof. The liquid devolatilized product can be discharged therethrough under gravity, pressure or both. In addition a fine orifice die can be affixed to the product outlet for extruding and cooling the product to form strands or pellets.

The gear train is mounted in the chamber and includes at least two closely meshed rotatable pumping gears adapted, as indicated, to discharge solution through the product outlet upon intermeshing. The pumping gears are preferably mounted so that their axes lie in a substantially horizontal plane so that the discharge of product therefrom may be assisted by gravity. However these gears may be mounted so that axes thereof lie in planes of various angles with the horizontal up to 90° therewith for pumping the product, for example, horizontally out of the chamber if desired.

The gear train further includes at least one rotatable feeding gear openly intermeshed with one of the pumping gears and substantially removed from the intermeshing discharge zone of said pumping gears in order to permit the unobstructed discharge of the product therefrom.

There may be one feeding gear as indicated above or several feeding gears may partially intermesh with each pumping gear or be mounted in at least one series with one another with one feeding gear of the series intermeshing with a pumping gear, providing the intermeshing discharge zone of the pumping gears is left unobstructed as set forth above. Preferably the invention has a pair of fully intermeshed pumping gears and two feeding gears, each of which is openly intermeshed with a pumping gear.

The pumping gears are closely intermeshed to provide substantially the minimum backlash or clearance, allowable between tooth and tooth space thereof so that the gears will roll together smoothly. Such close clearance provides a relatively closed bite and enables the engaging gears to substantially strip one another of any material deposited thereon and thus serve as a pump. The pumping gears are therefore rotated so that the direction of travel of the intermeshing teeth thereof is away from the product outlet or at least the inner portion thereof.

The feeding gears are openly intermeshed with their respective pumping gears and, if arranged in series, with each other. By gears "openly intermeshed" is meant gears which intermesh to provide excessive clearance beyond mechanical requirements between tooth and tooth space of engaging gears. This excess clearance provides an open bite between such engaging gears so that the feed material may be carried between the openly intermeshing gear surfaces to be worked by shearing and compacting as the gears roll together. Such clearance may be obtained between engaging gears in several ways. Examples are: by giving a small variation to the center distance at which the gears are mounted to provide an excessive distance between axes thereof, by making at least a portion of the teeth of at least one engaging gear extra thin or by spacing apart the teeth of at least one gear an excessive amount. Preferably the teeth of the feeding gear are cut extra thin as illustrated, for example, in FIGURE 1A.

The types of gears in the gear train may be of several types including helical, herringbone or spur gears. Herringbone gears are preferred since they have the advantage of the helical gears of uniform load transfer between engaging gears, since several mating teeth are in contact at once, without the inherent disadvantage thereof of end thrust.

The gear train is preferably positioned in the chamber so that the bottom and outer periphery thereof is in working proximity with the bottom and side walls of the chamber, i.e., the gears are partially shrouded by the housing containing the chamber. The chamber walls may thus be contoured to the bottom and outer profile of the gear train as illustrated, for example, in FIGURE 1. Such arrangement provides for the working of the feed solution between gear teeth and wall as well as between intermeshing gear surfaces.

The gears are suitably cored for uniform heating or cooling and should be maintained above the melting point of the solution constituents for smooth flow thereof and to assist in devolatilization of solvent. The pumping gears should be controlled at a higher temperature than the feding gears. This will facilitate the transfer of liquid product to the pumping gears due to the resulting viscosity reduction and increased flowability of the product in contact therewith. As the foamed solution is worked between pumping and feed gears it will be distributed therebetween in accordance with the nature of the materials, process conditions and geometry of the gears. A portion of the worked product will then be recycled on the feeding gears and the other portion will be retained on the pumping gears for discharge.

The gear train members can be rotated by any conventional drive means engaging one or more of such members.

The housing and the gears are preferably made of metal such as stainless steel although various rigid, corrosive resistant, durable materials which can withstand high temperatures and pressure differentials may be employed as determined by the skilled practitioner.

The following example is included to illustrate the performance of the invention.

EXAMPLE I

A number of trails were run with the apparatus of the invention to devolatilize 8 percent rubber-modified polystyrene in a solvent of ethyl benzene. The arrangement of pumping and feeding gears was substantially as shown in the figures. The gears were the herringbone type and had the following dimensions:

| | |
|---|---|
| Pitch diameter | 1.2 in. |
| Working tooth depth | 0.2 in. |
| Tooth length | 2.0 in. |
| Diametrical pitch | 10 |
| Number of teeth | 12 |

The feeding gears differed from the pumping gears in that about 50 percent of each tooth of the former gears was cut away along its leading face. The following table illustrates the results of several trials under varying feed input rates.

In the above trials the solids input rate was substantially the same as the solids output rate. The table illustrates that as the input rate of solids and volatile increases the percent solids in the product tends to decrease. Similarly the percent solvent removed from the resin, or devolatization efficiency shows a general decline as the input rate increases. This trend might be expected from the rising volume of incoming feed resulting in a comparatively thicker foam blanket on the gears which would tend to inhibit vapor release. The percent product solids can be raised however for increased rates by adjustments of the tabulated variables such as lowering the chamber pressure or increasing the feed temperature and other means such as increasing the size of the apparatus components. For lowering the product solids these adjustments may be made in the reverse direction.

Such adjustments will lie within the operating range of the apparatus of the invention. This range is defined by the rate and percent of feed solids which can be effectively devolatized to at least 90 percent solids and depends primarily on the size of the apparatus components and the nature of the feed materials. Above this range, where feed solvent enters the chamber at excessive rate, the foam blankets on the gears become so large that they close off the vapor release area in the chamber, blocking effective devolatilization. While below this range where the solvent content of the entering solution is too small the solution does not foam properly resulting in a partial forming and milling operation and non-uniformity of product. It was found the above described apparatus, at gear speeds of from 100 to 300 r.p.m., effectively devolatized a feed solution of 8 percent rubber-modified polystyrene from 50% to 80% as shown in the following table:

| Percent feed solids: | Limits of dry polymer rate, #/hr. |
|---|---|
| 50 | 4 to 27 |
| 60 | 7 to 40 |
| 70 | 15 to 60 |
| 80 | 35 to 80[1] |

[1] 80=#/hr. was the maximum attempted input rate.

Thus for 50 percent feed solids, a rate below 4 lbs. per hour resulted in insufficient solvent to maintain a uniform foam blanket and above 27 lbs. per hour, solvent entered at an excessive rate blocking vapor release. As the percent solids content increased, a higher rate was necessary to provide sufficient solvent for uniform foaming.

Similarly it was found that a feed solution of polystyrene in its monomer of from 50% to 80% could be effectively devolatilized by the same apparatus.

For polystyrene the feed solids, a preferably concentration range is 65 to 75% because of the broad input range permitted and because 80% polystyrene of uniform molecular weight is not readily obtainable. With such a concentration range a product of up to 97% solids content may be obtained.

The product can then be advanced to a final stripping stage if desired, such as the milling apparatus disclosed in U.S. Patent No. 2,434,707, issued January 20, 1948, to W. R. Marshall, to obtain a product of over 99% solids.

| Solids Feed Rate, lbs./hr. | Feed, Percent Solids | Feed, T. ° C. | Chamber Pressure, mm. Hg. | Chamber and Vapor, T. ° C. | Gear, r.p.m. | Product, T. ° C. | Percent Solids | Percent Solvent Removed |
|---|---|---|---|---|---|---|---|---|
| 16.4 | 57.9 | 187 | 50 | 166 | 250 | 181 | 98.2 | 96.0 |
| 20.6 | 66.7 | 205 | 50 | 177 | 250 | 193 | 96.3 | 92.2 |
| 30.2 | 69.0 | 203 | 50 | 171 | 250 | 187 | 95.5 | 89.7 |
| 41.3 | 72.5 | 200 | 53 | 176 | 250 | 201 | 94.4 | 84.6 |
| 50.6 | 77.8 | 210 | 61 | 181 | 260 | 208 | 95.0 | 81.3 |
| 60.3 | 67.5 | 202 | 55 | 168 | 260 | 192 | 93.5 | 85.5 |

What is claimed is:

1. An apparatus for devolatilizing foamable viscous solutions comprising: a housing having a chamber therein, said housing having a feed inlet, a product outlet and a vapor outlet therein communicating with said chamber; a gear train mounted in said chamber having at least two closely intermeshed rotatable pumping gears and adapted to provide, when rotated, a discharge zone to discharge solution through said product outlet and at least one feeding gear adapted to intermesh with one of said pumping gears with excessive clearance between successive pairs of contacting teeth thereof to provide an open bite between said pumping and feeding gears, said feeding gear being substantially removed from the intermeshing discharge zone of said pumping gears and all of said gears being partially shrouded by said housing and exposed in said chamber in their remaining portions, the pumping gears being also exposed in the region of the product outlet; said feed inlet receiving foamable viscous solution maintained at selected temperature and pressure and directing said solution to the periphery of said feeding gear; said vapor outlet communicating with evacuating means for maintaining the chamber at a pressure substantially lower than said selected pressure and below the vapor pressure of the solution at said selected temperature and at least one gear being driven for rotating all the gears of the gear train so that the direction of travel of the intermeshing teeth of said pumping gears is away from at least the inner portion of said product outlet to discharge the product solution therethrough.

2. The apparatus of claim 1 wherein at least one feed port communicates with the shrouded portion of the periphery of said feeding gear for channeling the foamable viscous solution thereto.

3. The apparatus of claim 1 wherein the thickness of at least a portion of each tooth of the feeding gear is substantially smaller than the width of the cooperating tooth space of the pumping gear intermeshed therewith to provide said excessive clearance.

4. The apparatus of claim 1 having at least two spaced feeding gears, each of said feeding gears being meshed with a different pumping gear and means for feeding the foamable solution to the shrouded periphery of each feeding gear.

5. The apparatus of claim 4 wherein all of said gears are herringbone gears.

References Cited by the Examiner

UNITED STATES PATENTS

| 2,205,328 | 6/1940 | Wills | 18—12 X |
| 3,118,744 | 1/1964 | Erdmenger et al. | 34—183 |
| 3,147,514 | 9/1964 | Reilly | 18—2 |
| 3,177,127 | 4/1965 | Longstreth | 202—53 |
| 3,217,783 | 11/1965 | Rodenecker | 159—2 |

FOREIGN PATENTS 324,648 1/1930 Great Britain.

NORMAN YUDKOFF, *Primary Examiner.*

J. SOFER, *Assistant Examiner.*